(12) United States Patent
Nakamura

(10) Patent No.: US 6,801,423 B2
(45) Date of Patent: Oct. 5, 2004

(54) CAPACITOR ELEMENT WITH THICK CATHODE LAYER

(75) Inventor: Takahiro Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/434,441

(22) Filed: May 7, 2003

(65) Prior Publication Data

US 2004/0094321 A1 May 20, 2004

(30) Foreign Application Priority Data

May 15, 2002 (JP) ......................... 2002-140304

(51) Int. Cl.$^7$ ................................................ H01G 9/04
(52) U.S. Cl. ................. 361/516; 361/523; 361/525; 361/528; 361/529; 361/530; 29/25.03
(58) Field of Search .......................... 361/516, 519, 361/520, 523, 524, 528, 525, 529, 530, 532, 535, 537, 518, 534, 504, 509, 511, 232, 433; 29/25.03

(56) References Cited

U.S. PATENT DOCUMENTS

| | | | |
|---|---|---|---|
| 4,935,844 A | * | 6/1990 | Burn .................... 361/321.5 |
| 5,179,507 A | * | 1/1993 | Iijima .................... 361/534 |
| 5,734,546 A | | 3/1998 | Kuriyama et al. |
| 6,423,104 B1 | * | 7/2002 | Omori et al. ............. 29/25.03 |

* cited by examiner

Primary Examiner—Anthony Dinkins
Assistant Examiner—Nguyen T. Ha
(74) Attorney, Agent, or Firm—Merchant & Gould P.C.

(57) ABSTRACT

A capacitor element includes a porous member made of valve metal powder, an anode wire projecting from the porous member, and a cathode layer formed on the porous member. The cathode layer is formed to have a thickness of no less than 35 μm, and more preferably, no less than 40 μm.

11 Claims, 6 Drawing Sheets

FIG.3

| W1×D1(×D1)=1.2mm×2.0mm(×2.0mm) | | | | |
|---|---|---|---|---|
| W2×D2(×D2)=0.5mm×1.0mm(×1.0mm) | | | | |
| Cathode Layer Thickness (μm) | Buffer Layer Thickness (μm) | Impedance (Ω) (Average Value/ Standard Deviation) | | Increasing Rate of Impedance (%) |
| | | Before Soldering | After Soldering | |
| 10 | 2.5 | 14.00/18.47 | 93.93/70.56 | 570 |
| | 5.0 | 2.20/1.61 | 20.01/22.11 | 810 |
| | 10.0 | 4.13/3.47 | 26.07/17.61 | 530 |
| 20 | 2.5 | 1.23/0.23 | 10.22/2.93 | 730 |
| | 5.0 | 0.98/0.08 | 6.63/2.13 | 570 |
| | 10.0 | 1.31/0.41 | 12.81/7.64 | 880 |
| 50 | 2.5 | 0.98/0.06 | 2.24/0.42 | 130 |
| | 5.0 | 1.01/0.28 | 1.32/0.40 | 30 |
| | 10.0 | 0.91/0.12 | 1.41/0.31 | 50 |

FIG.4

| W1×D1(×D1)=1.2mm×2.0mm(×2.0mm) | | | | |
|---|---|---|---|---|
| W2×D2(×D2)=0.5mm×1.0mm(×1.0mm) | | | | |
| Cathode Layer Thickness (μm) | Buffer Layer Thickness (μm) | Dielectric Loss (%) (Average Value/ Standard Deviation) | | Increasing Rate of Dielectric Loss (%) |
| | | Before Soldering | After Soldering | |
| 10 | 2.5 | 66.94/77.75 | 168.7/118.53 | 150 |
| | 5.0 | 7.74/6.37 | 36.93/38.69 | 380 |
| | 10.0 | 15.16/8.65 | 48.67/30.10 | 220 |
| 20 | 2.5 | 4.32/0.65 | 10.22/2.93 | 140 |
| | 5.0 | 4.06/1.00 | 6.63/2.13 | 60 |
| | 10.0 | 4.96/1.17 | 12.81/7.64 | 160 |
| 50 | 2.5 | 3.48/0.30 | 5.72/0.67 | 60 |
| | 5.0 | 3.25/0.50 | 3.90/1.04 | 20 |
| | 10.0 | 3.41/0.29 | 4.26/0.72 | 20 |

FIG.5

| W1×D1(×D1)=1.6mm×3.2mm(×3.2mm) | | | | |
|---|---|---|---|---|
| W2×D2(×D2)=1.5mm×1.5mm(×1.5mm) | | | | |
| Cathode Layer Thickness ($\mu$m) | Buffer Layer Thickness ($\mu$m) | Impedance ($\Omega$) (Average Value/ Standard Deviation) | | Increasing Rate of Impedance (%) |
| | | Before Soldering | After Soldering | |
| 10 | 2.5 | 1.96/0.33 | 5.10/1.32 | 160 |
| | 5.0 | 1.27/0.10 | 3.99/0.59 | 210 |
| | 10.0 | 1.28/0.13 | 4.68/1.31 | 270 |
| 20 | 2.5 | 0.41/0.04 | 1.31/0.10 | 220 |
| | 5.0 | 0.39/0.03 | 0.94/0.12 | 140 |
| | 10.0 | 0.40/0.04 | 0.97/0.05 | 150 |
| 50 | 2.5 | 0.44/0.08 | 0.55/0.07 | 20 |
| | 5.0 | 0.36/0.04 | 0.44/0.04 | 20 |
| | 10.0 | 0.38/0.03 | 0.44/0.04 | 20 |

FIG.6

| W1×D1(×D1)=1.6mm×3.2mm(×3.2mm) | | | | |
|---|---|---|---|---|
| W2×D2(×D2)=1.5mm×1.5mm(×1.5mm) | | | | |
| Cathode Layer Thickness ($\mu$m) | Buffer Layer Thickness ($\mu$m) | Dielectric Loss (%) (Average Value/ Standard Deviation) | | Increasing Rate of Dielectric Loss (%) |
| | | Before Soldering | After Soldering | |
| 10 | 2.5 | 12.05/1.70 | 19.70/4.10 | 60 |
| | 5.0 | 8.95/1.73 | 15.60/1.78 | 70 |
| | 10.0 | 8.16/1.24 | 17.52/4.48 | 110 |
| 20 | 2.5 | 2.88/0.43 | 5.11/0.31 | 80 |
| | 5.0 | 2.77/0.38 | 4.46/0.43 | 60 |
| | 10.0 | 2.89/0.44 | 4.46/0.22 | 50 |
| 50 | 2.5 | 3.64/1.04 | 3.22/0.51 | -10 |
| | 5.0 | 2.47/0.35 | 2.60/0.24 | 10 |
| | 10.0 | 2.77/0.48 | 2.60/0.11 | -10 |

FIG.7

| W1×D1(×D1)=2.8mm×3.5mm(×3.5mm) | | | | |
|---|---|---|---|---|
| W2×D2(×D2)=1.5mm×2.5mm(×2.5mm) | | | | |
| Cathode Layer Thickness ($\mu$m) | Buffer Layer Thickness ($\mu$m) | Impedance ($\Omega$) (Average Value/ Standard Deviation) | | Increasing Rate of Impedance (%) |
| | | Before Soldering | After Soldering | |
| 10 | 2.5 | 2.29/1.20 | 5.10/2.19 | 120 |
| | 5.0 | 1.72/0.86 | 5.26/1.32 | 210 |
| | 10.0 | 1.32/0.45 | 3.40/2.01 | 160 |
| 20 | 2.5 | 0.46/0.05 | 1.23/0.33 | 170 |
| | 5.0 | 0.52/0.07 | 1.72/0.27 | 230 |
| | 10.0 | 0.46/0.05 | 1.37/0.49 | 200 |
| 50 | 2.5 | 0.41/0.03 | 0.75/0.08 | 80 |
| | 5.0 | 0.36/0.02 | 0.54/0.08 | 50 |
| | 10.0 | 0.40/0.05 | 0.50/0.06 | 30 |

FIG.8

| W1×D1(×D1)=2.8mm×3.5mm(×3.5mm) | | | | |
|---|---|---|---|---|
| W2×D2(×D2)=1.5mm×2.5mm(×2.5mm) | | | | |
| Cathode Layer Thickness ($\mu$m) | Buffer Layer Thickness ($\mu$m) | Dielectric Loss (%) (Average Value/ Standard Deviation) | | Increasing Rate of Dielectric Loss (%) |
| | | Before Soldering | After Soldering | |
| 10 | 2.5 | 10.89/3.26 | 19.96/5.38 | 80 |
| | 5.0 | 10.82/6.17 | 17.49/3.50 | 60 |
| | 10.0 | 7.99/3.20 | 11.81/5.74 | 50 |
| 20 | 2.5 | 3.11/0.28 | 4.85/0.93 | 60 |
| | 5.0 | 3.62/0.56 | 6.09/0.77 | 70 |
| | 10.0 | 3.15/0.53 | 5.24/1.49 | 70 |
| 50 | 2.5 | 3.05/0.37 | 3.34/0.30 | 10 |
| | 5.0 | 2.90/0.39 | 2.95/0.21 | 0 |
| | 10.0 | 2.91/0.62 | 2.71/0.18 | -10 |

CAPACITOR ELEMENT WITH THICK CATHODE LAYER

BACKGROUND OF THE INVENTION

1. Field of the Invention

The present invention relates to a capacitor element which is less likely to break due to heat as compared with prior art capacitor elements. The present invention also relates to a method of making such a capacitor element.

2. Description of the Related Art

FIG. 9 illustrates an example of prior art solid electrolytic capacitor. The capacitor includes a resin package 90 and a capacitor element 91 sealed in the package. The capacitor element 91 includes a porous sintered body 91A, an anode wire 91B partially embedded in the sintered body 91A, and a cathode layer 91C formed on the sintered body 91A. As shown in the figure, the cathode layer 91C is connected to a cathode lead 02, whereas the anode wire 91B is connected to an anode lead 93. The cathode lead 92 and the anode lead 93 include portions 92a, 93a sealed in the package 90 and portions 92b, 93b projecting outward from the package 90. The outer portions 92b, 93b extend downwardly along the side surfaces of the package 90 and then extend horizontally along the bottom surface of the package 90. With such a structure, the capacitor 9 can be surface-mounted on a circuit board by soldering, for example.

In the prior art capacitor 9, the cathode layer 91C has a relatively small thickness in the range of 20–30 $\mu$m, for example. However, such a small thickness causes the following problems.

As methods for mounting the capacitor 9 on a circuit board, there exist flow soldering and reflow soldering. In these methods, the capacitor 9 is heated in melting the applied solder material, so that the package 90 and the cathode layer 91C (and other components) undergo thermal expansion. However, since cathode layer 91C differs from the package 90 differs in thermal expansion coefficient, stress is applied to the cathode layer 91C. As a result, the cathode layer 91C which has a relatively small thickness may be broken. Particularly, portions 91c indicated in FIG. 9 (which correspond to corner portions of the sintered body 91A) are further thinner than other portions of the cathode layer 91C. Therefore, there is much possibility that the thin-walled portions 91c break during the flow soldering (or reflow soldering). Further, due to such breakage, the cathode layer 91C becomes likely to be removed from the sintered body 91A.

The above-described defect of the cathode layer 91C is not preferable, because it causes an increase in impedance and dielectric loss of the capacitor element 91. Further, when such defect is serious, the intended capacitor characteristics cannot be obtained at all.

SUMMARY OF THE INVENTION

An object of the present invention, which is conceived under the circumstances described above, is to provide a capacitor element capable of preventing the cathode layer from being broken or removed during the soldering.

According to a first aspect of the present invention, there is provided a capacitor element comprising a porous member made of valve metal powder, an anode wire projecting from the porous member, and a cathode layer formed on the porous member. The cathode layer has a thickness of no less than 35 $\mu$m. More preferably, the thickness of the cathode layer is no less than 40 $\mu$m.

Preferably, the impedance after flow soldering is no more than twice the impedance before the flow soldering. More preferably, the impedance after flow soldering is no more than 1.5 times the impedance before the flow soldering.

Preferably, the cathode layer is formed by heating conductor paste applied on the porous member.

Preferably, the conductor paste contains conductor powder, binder and solvent.

Preferably, the cathode layer is formed by repetitively performing a process which comprises applying conductor paste on the porous member and heating the conductor paste.

According to a second aspect of the present invention, there is provided a capacitor element comprising a porous member made of valve metal powder, an anode wire projecting from the porous member, a cathode layer formed on the porous member, an anode lead connected to the anode wire, a cathode lead connected to the cathode layer, and a resin package sealing the porous member, the anode wire and the cathode layer. The cathode layer has a thickness of no less than 35 $\mu$m.

According to a third aspect of the present invention, there is provided a method of making a capacitor element comprising the steps of preparing a porous member of valve metal powder, and heating conductor paste applied on the porous member to form a cathode layer. The cathode layer is formed to have a thickness of no less than 35 $\mu$m.

Preferably, the thickness of the cathode layer is controlled by adjusting the viscosity of the conductor paste.

Other objects, features and advantages of the present invention will become clearer from the description of the preferred embodiment given below.

BRIEF DESCRIPTION OF THE DRAWINGS

FIGS. 3 through 8 show results of the experiment performed by the inventor of the present invention.

DETAILED DESCRIPTION OF THE PREFERRED EMBODIMENTS

Preferred embodiments of the present invention will be described below in detail with reference to the accompanying drawings.

Figure 1:
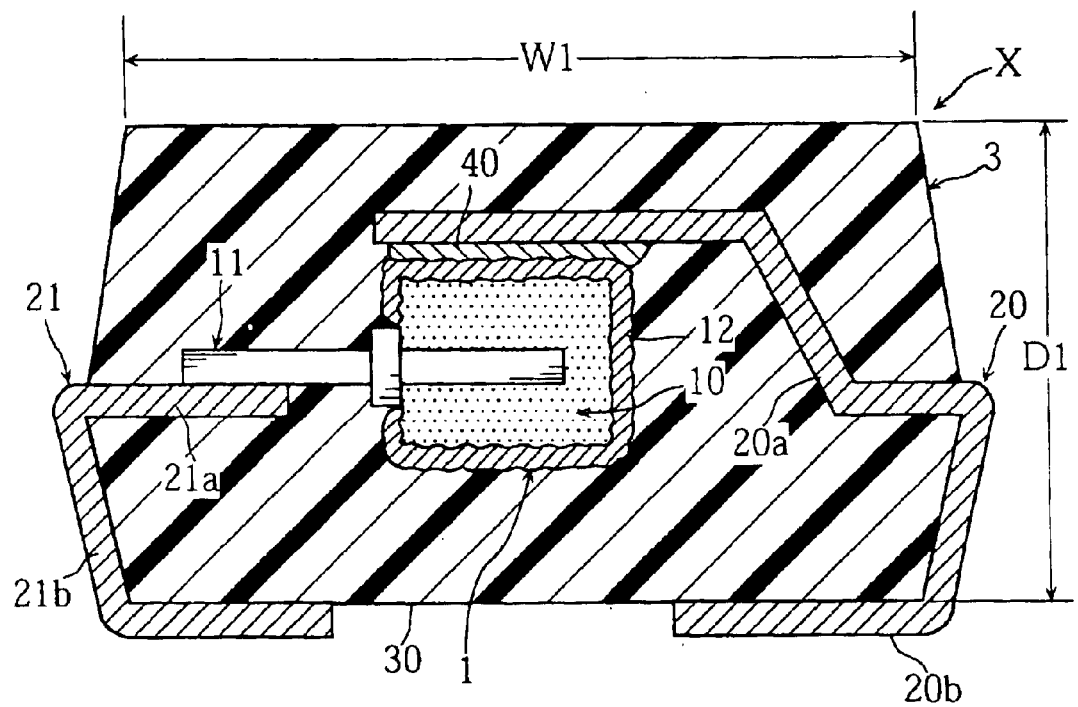
FIG. 1 is a sectional view illustrating a capacitor according to the present invention.

FIG. 1 schematically illustrates the internal structure of a capacitor X according to the present invention. As shown in the figure, the capacitor X includes a capacitor element 1, leads 20 and 21 connected to the capacitor element 1, and a resin package 3 sealing the capacitor element 1. Although the capacitor X in the illustrated example is a solid electrolytic capacitor, the present invention is not limited thereto.

The capacitor element 1 includes a porous sintered body 10, an anode wire 11 partially embedded in the sintered body 10, and a cathode layer 12 formed on the sintered body 10.

The lead 20 (hereinafter referred to as cathode lead 20) is connected to the cathode layer 12. The lead 21 (hereinafter referred to as anode lead 21) is connected to the anode wire 11. The cathode lead 20 and the anode lead 21 include inner portions 20a, 21a sealed in the package 3 and outer portions 20b, 21b projecting outward from the package 3. The outer portions 20b, 21b extend downwardly along the side surfaces of the package 3 and then extend horizontally along the bottom surface 30 of the package 3. With such a structure, the capacitor X can be surface-mounted on a printed circuit board, for example. The cathode lead 20 and the anode lead 21 may be formed of nickel alloy or copper, for example.

The package 3 may be made of epoxy resin, for example. Such a resin package may be made by transfer molding.

The sintered body 10 is formed by compacting valve metal powder into a rectangular parallelepiped member and then sintering the compacted member under high vacuum. At that time, the anode wire 11 is partially embedded in the compacted member. The anode wire 11 is made of the same material as that of the sintered body 10. As the valve metal powder, use may be made of tantalum, aluminum or niobium. The pores of the sintered member 10 are filled with dielectric material and solid electrolyte. The dielectric material may be an oxide of the metal forming the sintered body 10, for example. The formation of the dielectric material in the pores of the sintered body 10 may be performed by anodizing. The formation of solid electrolyte is performed after the dielectric material is formed. The dielectric material previously formed does not completely fill the pores of the sintered body 10 but leaves hollow portions. The solid electrolyte is formed in the hollow portions. The solid electrolyte is formed by impregnating the sintered body 10 in an aqueous solution of manganese nitrate followed by heating the sintered body 10. Preferably, this process is performed until the pores of the sintered body 10 are completely filled. Therefore, the impregnation process and the heating process are repetitively performed a plurality of times.

Figure 2:
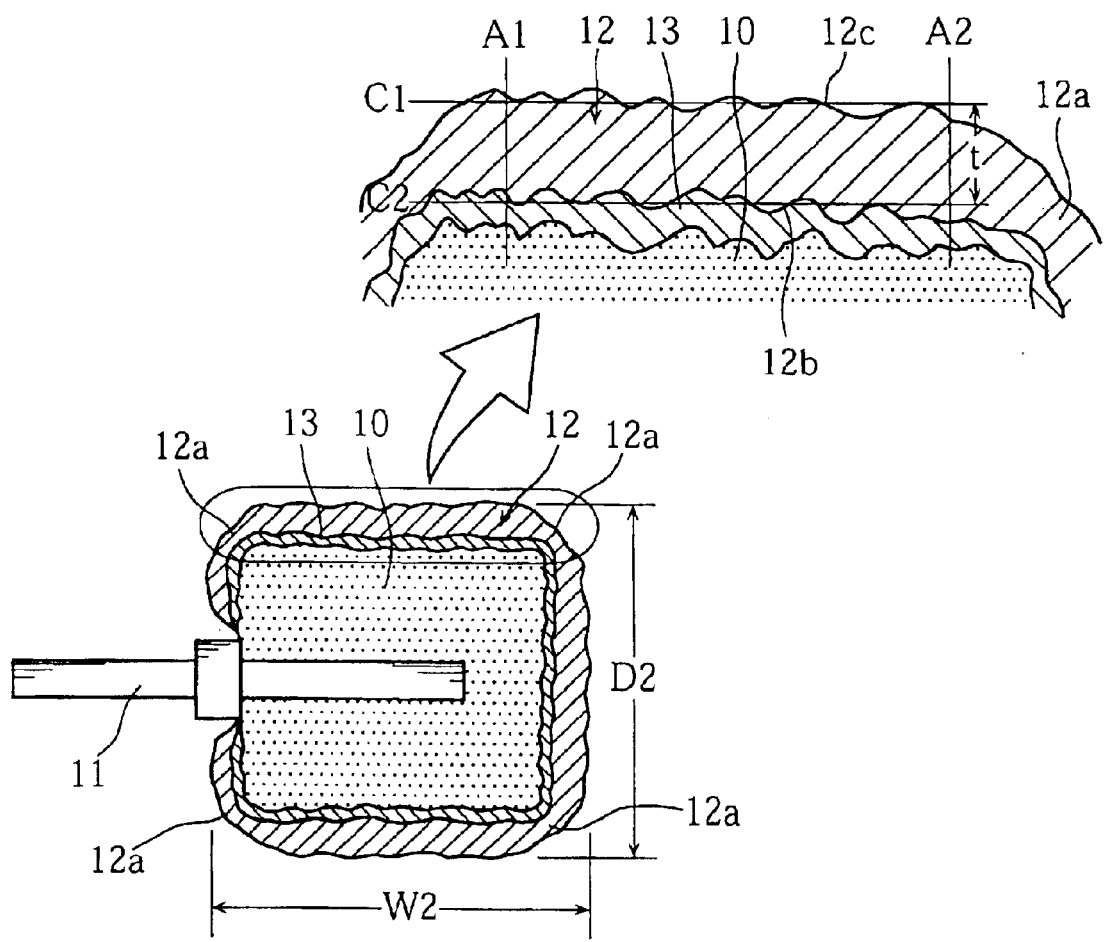
FIG. 2 is a sectional view illustrating a capacitor element included in the capacitor of FIG. 1.
Figure 9:
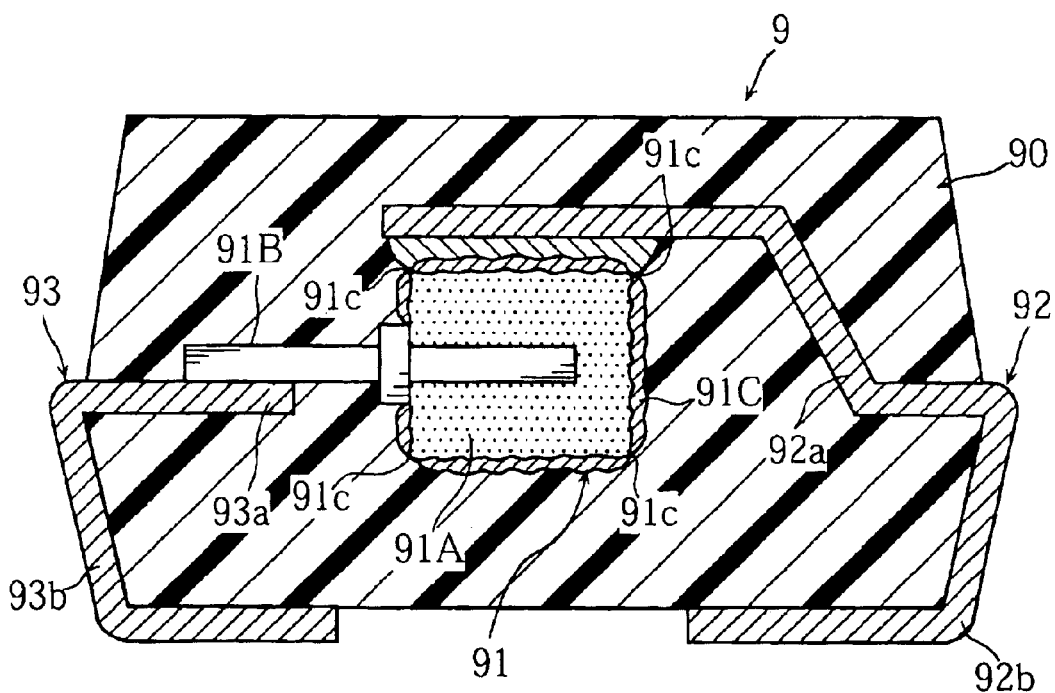
FIG. 9 is a sectional view illustrating a prior art capacitor.

As shown in FIG. 2, the cathode layer 12 covers the sintered body 10 via a buffer layer 13. As shown in FIG. 1, the cathode layer 12 is connected to the inner portion 20a of the lead 20 via a conductive adhesive layer 40. The conductive adhesive layer 40 is formed by heating and then solidifying silver paste or solder paste. The buffer layer 13 is provided for reducing the contact resistance between the solid electrolyte layer formed at the sintered body 10 and the cathode layer 12. The buffer layer 13 is optional and is provided only when necessary. For example, the buffer layer 13 is provided when the solid electrolyte is made of $MnO_2$ while the cathode layer 12 is made of silver. The buffer layer 13 may be made of graphite, for example.

The cathode layer 12 has a relatively small thickness at portions (thin-walled portions 12a) corresponding to corner portions of the sintered body 10. Other portions of the cathode layer have a thickness (hereinafter defined as "average main thickness") which is no less than 35 $\mu$m and preferably no less than 40 $\mu$m. When the average main thickness of the cathode layer 12 is set to such an extent, a sufficient thickness is maintained also at the thin-walled portions 12a, which prevents the thin-walled portions 12a from breaking due to a stress caused by heating in the reflow soldering. As a result, it is possible to prevent impedance or dielectric loss in the capacitor X from becoming unduly large.

The above-described "average main thickness" may be defined as follows. Firstly, the average main thickness refers to the thickness after the capacitor element 1 is formed and before the capacitor X is subjected to flow soldering. Secondly, the average main thickness refers to the thickness at portions (hereinafter referred to as "main thickness portion") other than the portions like the thin-walled portion 12a (FIG. 2) which are much thinner than other portions of the cathode layer 12. In the example shown in FIG. 2, the main thickness portion is a portion between a vertical line A1 and another vertical line A2. Thirdly, the average main thickness refers to an average thickness of the main thickness portion. Specifically, the distance t between parallel lines C1 and C2 given in FIG. 2 is defined as the average thickness. The line C1 is a center line as a reference for representing the roughness of an outer surface 12c (which contacts the package 3) of the cathode layer 12 by center line average roughness. Similarly, the line C2 is a center line as a reference for representing the roughness of an inner surface 12b (which faces the sintered body 10) of the cathode layer 12 by center line average roughness.

As described above, the average main thickness of the cathode layer 12 is set to no less than 35 $\mu$m (preferably no less than 40 $\mu$m) according to the present invention. In this case, the impedance (or dielectric loss) of the capacitor X after the capacitor X is mounted on a printed circuit board by flow soldering (by contact with a solder bath of 260° C. for ten seconds) is controlled to no less than twice the impedance (or dielectric loss) before the flow soldering.

The cathode layer 12 may be formed by applying conductor paste on the surface of the buffer layer 13 followed by heating the paste. The application of the conductor paste may be performed by immersing the sintered body 10 in a bath containing the conductor paste. The application and heating of the conductor paste may be performed a plurality of times so that an intended film thickness is obtained. The conductor paste maybe composed of conductive powder, binder powder and solvent, for example. As the conductive powder, silver powder may preferably be used. As the binder powder, thermoplastic resin powder or glass powder may preferably be used. Any solvent may be used provided that the solvent evaporates at the melting point of the binder powder. The thickness adjustment of the cathode layer 12 may be performed by adjusting the viscosity of the conductive paste to appropriately set the applied amount of the conductive paste and the amount of the evaporating component (solvent).

The inventor of the present invention prepared samples (experimental capacitors) having such a structure as shown in FIG. 1 and examined the samples for the relationship between the electrical characteristics and the thickness t of the cathode layer before and after the heating (flow soldering). As the electrical characteristics, impedance and dielectric loss were checked. The flow soldering was performed by provisionally mounting each sample capacitor to a circuit board and thereafter bringing the sample capacitor into contact with a solder bath of 260° for ten seconds.

Specifically, as experimental capacitors, three types (a first through a third types) of capacitors were prepared which differed from each other in size of the resin package and of the capacitor element. As shown in FIG. 1, the size of the resin package is determined based on the length W1, the height D1 and the width (the dimension perpendicular to the sheet surface). In this experiment, however, the height D1 and the width were made equal to each other in each of the packages. Similarly, as shown in FIG. 2, the size of the capacitor element is determined based on the length W2, the height D2 and the width (the dimension perpendicular to the sheet surface). The height D2 and the width were made equal to each other also in each of the capacitor elements. The size of the package and the capacitor element given below is represented as length×height (×width). For example, the size of the package shown in FIG. 1 is represented as W1×D1× (D1).

The first type of experimental capacitors included a resin package having a size of 1.2 mm×2.0 mm(×2.0 mm) and a capacitor element having a size of 0.5 mm×1.0 mm(×1.0 mm).

The second type of experimental capacitors included a resin package having a size of 1.6 mm×3.2 mm(×3.2 mm) and a capacitor element having a size of 1.5 mm×1.5 mm(×1.5 mm).

The third type of experimental capacitors included a resin package having a size of 2.8 mm×3.5 mm(×3.5 mm) and a capacitor element having a size of 1.5 mm×2.5 mm(×2.5 mm).

Experimental results of the first type of capacitors are given in FIG. 3 (impedance) and FIG. 4 (dielectric loss). As will be understood from the tables, three kinds of cathode layers 12 (made of silver) were formed which differed from each other in average main thickness (10 $\mu$m, 20 $\mu$m, 50 $\mu$m). Further, three kinds of buffer layers 13 (made of graphite) differing from each other in thickness were formed with respect to each kind of cathode layers having a different average main thickness. As a result, nine kinds of capacitors were prepared as the first type of experimental capacitors. In the experiment by the inventor of the present invention, ten samples were prepared for each of the nine kinds. (Accordingly, ninety samples in total were prepared as the first type of capacitors.)

Experimental results of the second type of capacitors are given in FIG. 5 (impedance) and FIG. 6 (dielectric loss). The number, thickness of the cathode layer 12 and thickness of the buffer layer were the same as those of the samples of the first type capacitors.

Experimental results of the third type of capacitors are given in FIG. 7 (impedance) and FIG. 8 (dielectric loss). The number, thickness of the cathode layer 12 and thickness of the buffer layer were the same as those of the samples of the first type capacitors.

The following facts are found from FIGS. 3 through 8. Before the flow soldering, impedance and dielectric loss is small regardless of the thickness (average main thickness) of the cathode layer. However, when the thickness of the cathode layer is small (10 $\mu$m, 20 $\mu$m), the increasing rate of impedance (average value) is large (120–880%), and the increasing rate of dielectric loss (average value) is also large (50–380%). On the other hand, when the thickness of the cathode layer is large (50 $\mu$m), the increasing rate of impedance lies in the range of 20 to 80% (except for 130% in FIG. 3), whereas the increasing rate of dielectric loss lies in the range of –10 to 20% (except for 60% in FIG. 4). Considering the practicality, it is preferable that the increasing rate of impedance or dielectric loss is no more than 100% and preferably no more than 50%. From this viewpoint, the thickness of the cathode layer should be at least larger than 20 $\mu$m but need not necessarily be as large as 50 $\mu$m. Practically, the mean value between these, i.e. 35 $\mu$m is preferable as the thickness of the cathode layer. It is more preferable that the thickness of the cathode layer is no less than 40 $\mu$m.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

What is claimed is:

1. A capacitor element comprising:
    a porous member made of valve metal powder, the porous member including a first end surface, a second end surface opposite to the first end surface, and a side surface extending between the first end surface and the second end surface;
    an anode wire projecting from the first end surface of the porous member; and
    a cathode layer formed on the porous member, the cathode layer entirely covering at least the second end surface and the side surface of the porous member;
    the cathode layer having a thickness of no less than 35 $\mu$m.

2. The capacitor element according to claim 1, wherein the thickness of the cathode layer is no less than 40 $\mu$m.

3. The capacitor element according to claim 1, wherein impedance after flow soldering is no more than twice impedance before the flow soldering.

4. The capacitor element according to claim 1, wherein impedance after flow soldering is no more than 1.5 times impedance before the flow soldering.

5. The capacitor element according to claim 1, wherein the cathode layer is formed by heating conductor paste applied on the porous member.

6. The capacitor element according to claim 5, wherein the conductor paste contains conductor powder, binder and solvent.

7. The capacitor element according to claim 1, wherein the cathode layer is formed by repetitively performing a process which comprises applying conductor paste on the porous member and heating the conductor paste.

8. The capacitor element according to claim 1, further comprising an anode lead connected to the anode wire, a cathode lead connected to the cathode layer, and a resin package for sealing the porous member, the anode wire and the cathode layer.

9. The capacitor element according to claim 8, further comprising a conductive adhesive layer that connects the cathode lead to the cathode layer.

10. A method of making a capacitor element comprising the steps of:
    preparing a porous member of valve metal powder with an anode wire embedded partially in the porous member, the porous member including a first end surface, a second end surface opposite to the first end surface and a side surface extending between the first end surface and the second end surface, the anode wire protecting from the first end surface; and
    heating conductor paste applied on the porous member to form a cathode layer that entirely covers at least the second end surface and the side surface of the porous member;
    the cathode layer being formed to have a thickness of no less than 35 $\mu$m.

11. The method according to claim 10, wherein the thickness of the cathode layer is controlled by adjusting viscosity of the conductor paste.

* * * * *